Figure 2:
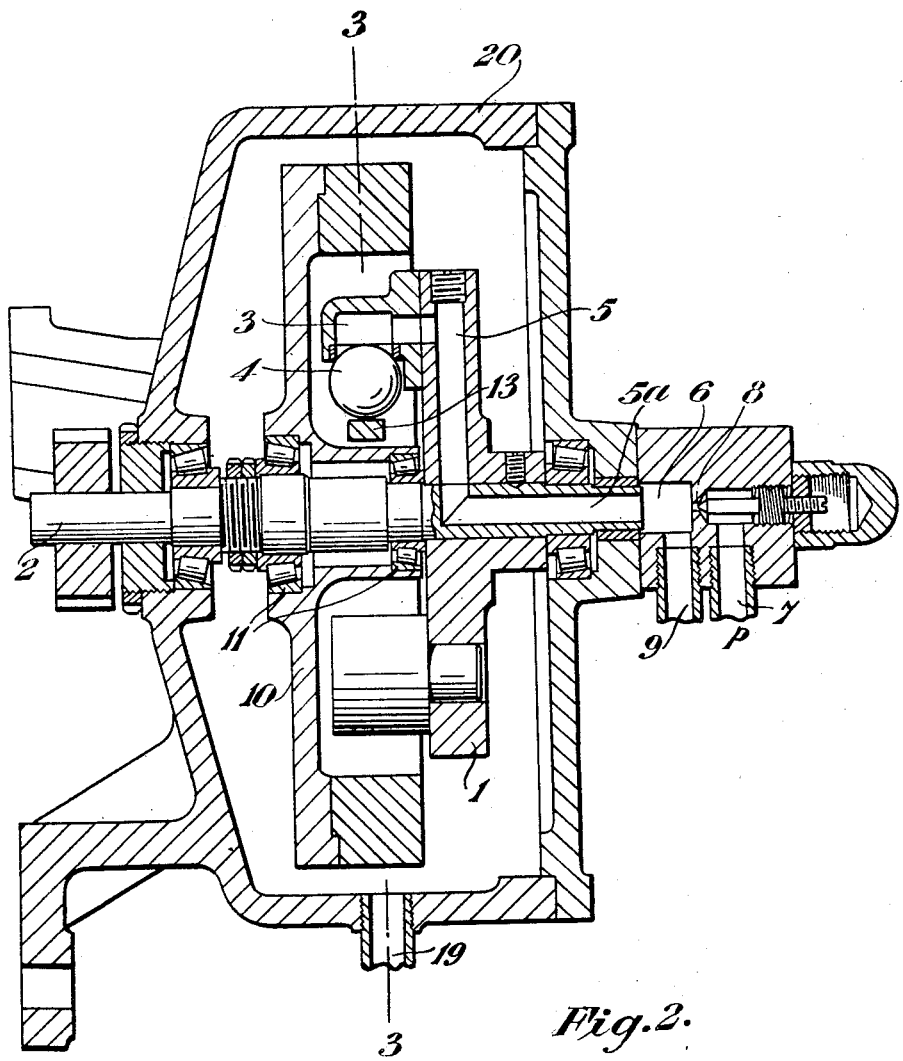

March 10, 1953   N. WORTHING   2,630,815
SPEED- AND ACCELERATION RESPONSIVE VALVE
Filed May 3, 1948   4 Sheets-Sheet 1
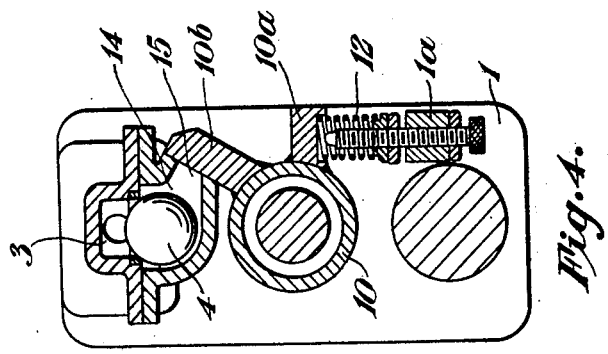
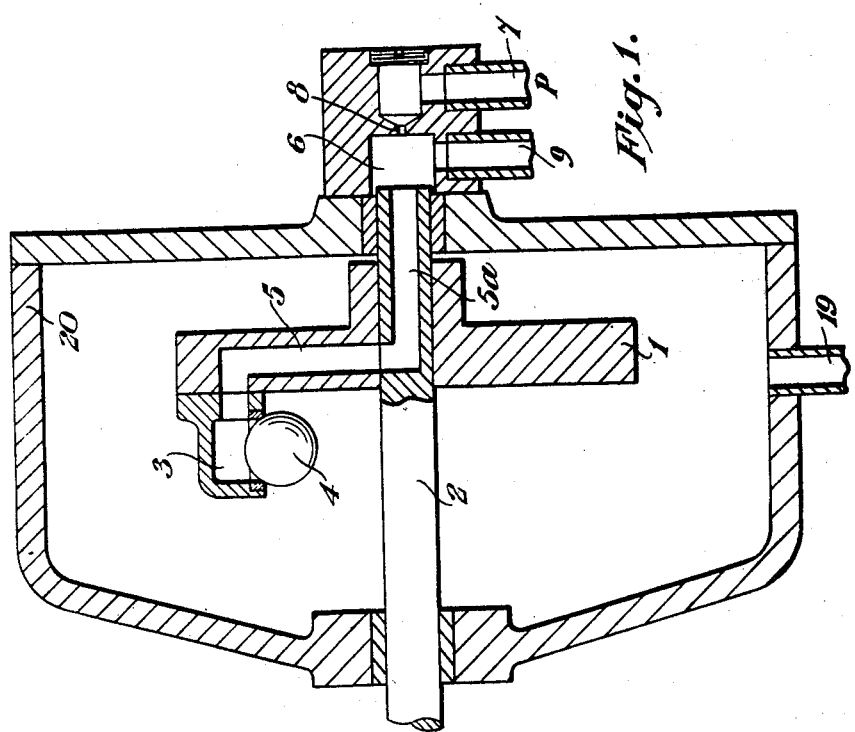

Patented Mar. 10, 1953

2,630,815

UNITED STATES PATENT OFFICE 2,630,815

SPEED- AND ACCELERATION-RESPONSIVE VALVE

Nicolas Worthing, London, England, assignor to Harland Engineering Company Limited, London, England, a company of Great Britain Application May 3, 1948, Serial No. 24,695
In Great Britain January 9, 1948

5 Claims. (Cl. 137—48)

This invention relates to speed-responsive devices which translate changes of speed into changes of pressure of a liquid, the latter being used to effect a control. It relates more particularly to speed governors in which the governor head translates the speed of a prime mover into pressure of a liquid, which pressure it transmits along a connecting pipe to a remotely situated actuator which is sensitive to pressure variations and, on being actuated by a pressure variation, operates the controls of the prime mover to regulate the speed.

One well known type of such a governor head is a centrifugal pump driven by the prime mover and running full of oil. The practical limitation of this type is that the viscous friction losses in the oil are hard to dissipate without causing an excessive temperature rise of the pump and the confined oil. For this reason it is normally designed for relatively low speeds and oil pressures.

Another well known type of such a governor head consists of a positive delivery pump, which may be either a reciprocating or a gear pump, driven by the prime mover and discharging through a constant leak, so that the pressure adjusts itself according to the speed. The disadvantage of this type is that considerable errors are introduced due to changes in viscosity of the operating liquid.

The essence of this invention lies in the design and operating principle of a new type speed-responsive device or governor head which will accurately translate speed into pressure of a liquid without the disadvantages of existing designs mentioned above.

A speed-responsive device, according to the invention, of the type translating speed changes into changes of pressure of a liquid, comprises a rotary member subject to the speed changes and which carries a liquid chamber adapted to be supplied with a restricted flow of liquid under pressure and having an escape controlled by a relatively movable valve member which under centrifugal force tends to close the escape against the action of the liquid pressure in the chamber.

In the preferred form of the device, the liquid used is oil and escapes from the said chamber towards the centre of rotation, a ball valve tending to close said escape by centrifugal force against the action of the oil pressure in the chamber.

According to a further feature of the invention the speed-responsive device comprises yielding inertia means influencing the said valve member whereby the latter is subject to adjustment when the rotary member is accelerating or decelerating.

In the preferred form of this feature, a flywheel constitutes the inertia means and is driven by the rotary member through a flexible coupling which reacts on the valve member.

The speed responsive device, as described above, may accordingly be provided with means for transmitting to the actuator a pressure which is proportional to the algebraic sum of two factors and a constant. The first factor is proportional to the square of the speed. The second factor is proportional to the acceleration of the prime mover. The constant is incidental to the design and plays no part when variations in the transmitted pressure are considered. For the small errors in speed which occur in operation the variation in transmitted pressure, to a first approximation, equals $An + Bn'$, where $n$ is the speed error, $n'$ is the acceleration, and A and B are constants.

The acceleration component in the transmitted pressure stabilises a system which would otherwise be unstable. An example of such a system is a water turbine installation with a large inertia of the water column in the penstock.

The device is thus especially suitable as a speed governor for water turbines and the like, and the changes of oil pressure in the chamber would then be used to operate the water gates through any well-known actuator. A suitable actuator for use with this device will be described hereinafter.

Figure 3:
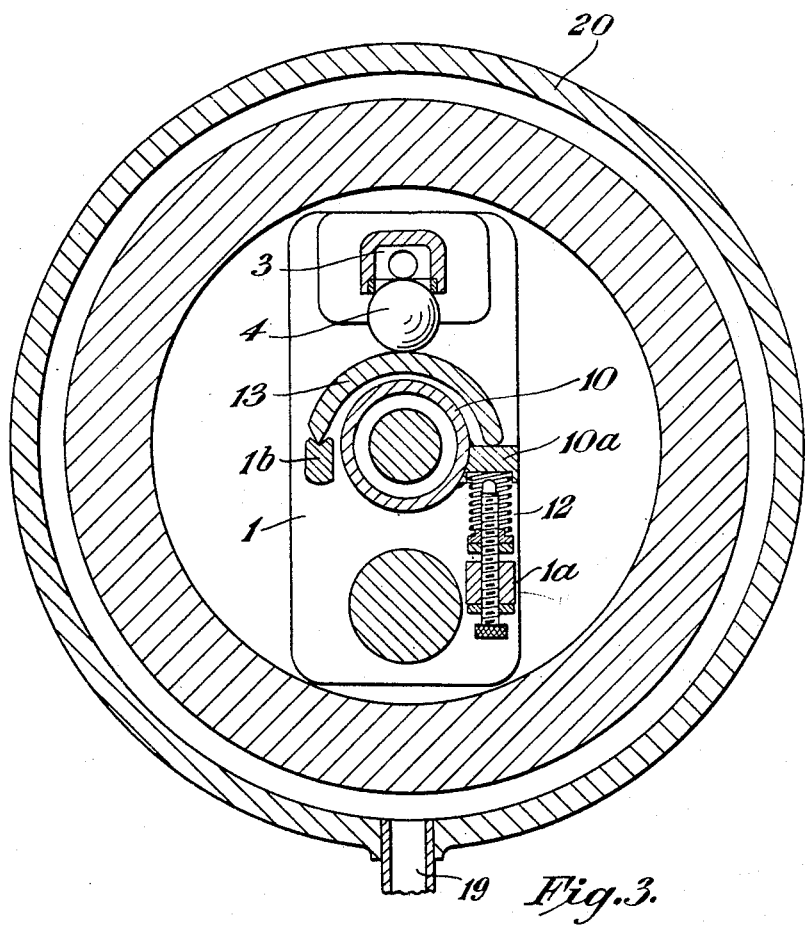
Figure 5:
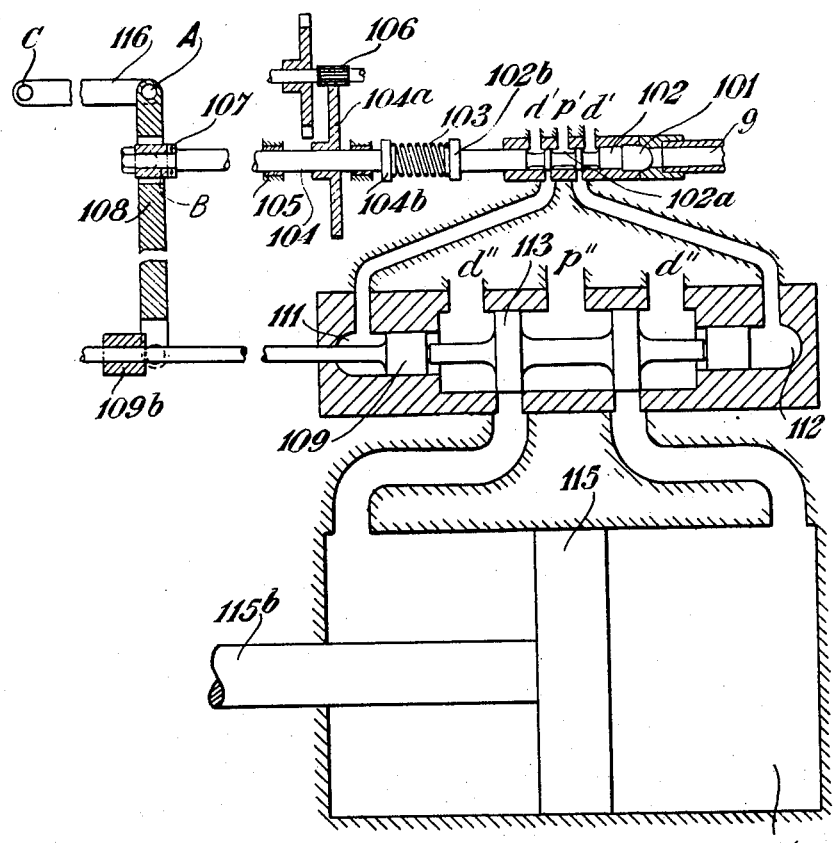

In the accompanying drawings:

Figure 1 is a cross-sectional elevation of a speed responsive device, included for the purpose of explaining in more detail an embodiment of the main principle of the invention, Figure 2 is a similar cross-sectional elevation of the same embodiment but in more complete detail and includes the acceleration-responsive device, Figure 3 is a section on the line 3—3 of Figure 2, Figure 4 is a sectional elevation of a detail modification of the device shown in Figures 2 and 3, and Figure 5 is a diagrammatic sectional elevation of an actuator operable by the speed-responsive device.

In Figure 1 the rotary member which is subject to the speed changes to which the device is required to respond, is an arm 1 keyed to a shaft 2 driven by a prime mover not shown. The rotary arm 1 carries at a suitable radius from the shaft an oil chamber 3 having a circular opening facing towards the shaft which opening is obstructed by a floating ball valve 4 disposed between the opening and the shaft.

An oil passage 5 connects the oil chamber 3 to a hollow portion of the shaft 5a leading to an adjacent stationary chamber 6 in sealed relationship with the shaft.

Oil from a pressure supply P is led in by pipe 7 through a constriction 8 into the stationary chamber 6 and passes along the connecting passages into the revolving chamber 3 whence it escapes through the floating ball valve aperture.

In operation, there are two opposing forces acting on the floating ball, i. e. the outward centrifugal force on the ball and the inward force due to the oil pressure in the revolving chamber 3. If the latter force is the greater, the ball lifts slightly off its valve seat thereby increasing the annular aperture and the resulting increase in the flow of oil drops the pressure in chamber 3 due to the constriction 8. Thus the ball automatically assumes a position in which the two opposing forces are equal. Thus the pressure in chamber 3 is proportional to the centrifugal force or the square of the speed.

The pressure in the stationary chamber 6 is equal to the pressure in chamber 3 less the centrifugal head of the oil column at the radius of the valve seat. This centrifugal head is also proportional to the square of the speed. Thus, the pressure in the stationary chamber 6 is also proportional to the square of the speed.

Provided the supply pressure is maintained above a predetermined value, the pressure in chamber 6 will not be affected by variations in the supply pressure but will be dependent only on the speed of the rotary member 1. A drain pipe 19 drains the escaped oil out of the casing 20.

A pipe 9 transmits this controlled pressure in chamber 6 to a remotely situated actuator which is sensitive to pressure variation. Such an actuator may be constructed in many ways, and an example of such will be hereinafter described.

In Figures 2 and 3, a flywheel 10 is mounted on frictionless bearings 11 on the shaft 2. A compression spring 12 acting between an arm 10a on the flywheel and a projection 1a on the rotary arm produces a torque tending to rotate the flywheel relatively to the shaft in a direction opposite to the clockwise rotation of the shaft. This torque is balanced by a reaction force from the floating ball acting through the curved beam 13, one end of which is pivoted on the projection 1b of the rotary arm 1 whilst the other end bears on the arm 10a. The spring 12 and the beam 13 thus constitute a flexible coupling driving the flywheel 10.

When there is no acceleration the beam 13 exerts a force on the floating ball due to the spring only. This force tends to close the oil escape from chamber 3 and produces a constant increase of pressure in the two chambers 3 and 6.

When the prime mover is accelerating, the beam 13 exerts on the floating ball an additional force proportional to the acceleration and the moment of inertia of the flywheel 10. This additional force produces an additional pressure in the two oil chambers.

During deceleration the constant pressure increase due to the spring is reduced by an amount proportional to the deceleration.

In Figure 4 the beam 13 and projection 1b are omitted. The oil escaping past the ball valve 4 is trapped in a chamber 14 which has an opening 15 in a radial plane. A valve arm 10b on the flywheel tends to close this opening due to the force in spring 12 and so creates a constant pressure in the chamber 14, which pressure acting on the valve 10b balances the torque due to spring 12. The pressure in chamber 14 exerts an outward force on the ball and increases the pressure in chambers 3 and 6 by the same amount.

During acceleration the pressure in chamber 14 rises an additional amount proportional to the acceleration and the moment of inertia of the flywheel 10. This additional pressure produces an additional pressure in chambers 3 and 6.

During deceleration the pressure in chamber 14 is reduced by an amount proportional to the deceleration.

In Figure 5, pipe 9 introduces the controlled pressure in the chamber 6 of the governor head into the control cylinder 101. The control piston 102 is integral with a two-way balanced pilot valve 102a and the collar 102b. The force on the control piston is balanced by the force of spring 103 acting on the collar 102b, so that at the correct speed the pilot valve is central. The other end of the spring 103 is carried by a collar 104b on the end of shaft 104 mounted in bearings 105. The spur gearwheel 104a meshes with a pinion 106 on the shaft of a small oil turbine or electric motor, whereby the shaft 104 is made to rotate. Spring 103 transmits the rotation to the pilot assembly 102. Rotation of the pilot valve reduces the effect of friction and increases the accuracy.

If the speed of the prime mover is too high, the pressure in control cylinder 101 will be above normal. The pilot valve 102a will be displaced to the left admitting oil from the pressure supply P' into cylinder 111 and connecting cylinder 112 to the drain d'. The relay piston 109 will start pushing the two-way balanced relay valve 113 over to the right. At the same time the collar 109b which is integral with the relay piston 109 pushes the bottom of lever 108 over to the right. Lever 108 pivots about the fulcrum A so that the point B, the thrust bearing 107 and the shaft 104 all move to the right. This compresses spring 103 so that the pilot valve will re-centre and stop further movement of the relay valve. In this way the relay valve is displaced by an amount proportional to the error in speed. This displacement admits oil from the pressure supply P'' into the right hand portion of the servo-motor 114 and the piston 115 and piston rod 115b move to the left and drive the controls of the prime mover to lower the speed.

Speed adjustment is achieved by moving the fulcrum point A of lever 108. To increase the speed, the end C of lever 116 is moved to the right.

In the case of prime movers requiring a relatively small oil servo-motor to operate the controls, the oil servo-motor can be controlled directly by the pilot valve, in which case the relay valve and lever 108 are omitted.

What I claim is:

1. A speed- and acceleration-responsive device of the type translating speed and acceleration changes into changes of pressure of a liquid, comprising a rotary member subject to the speed changes, a liquid chamber carried by said rotary member, means for supplying said chamber with a restricted flow of liquid under pressure, outlet means providing a single passage for a liquid escape from said chamber, a ball valve comprised in said outlet means and tending to close the said passage under centrifugal force against the action of the liquid pressure in the chamber whereby a response to speed is provided, rotatable inertia means, a drive connection between said rotatable inertia means and said rotary member, resilient means in said drive connection, and a member interposed between said rotary member and said inertia means and being operable in response to relative movement between said rotary member and said inertia means for reacting with the pressure of fluid in said passage and with the resilience of the said resilient means whereby the said response to speed is modified by a response to acceleration.

2. A speed- and acceleration-responsive device of the type translating speed and acceleration changes into changes of pressure of a liquid, comprising a rotary member subject to the speed changes, a liquid chamber carried by said rotary member, means for supplying to said chamber a restricted flow of liquid under pressure, outlet means providing a single passage for a liquid escape from said chamber, in conjunction with said outlet means a valve member which tends to be opened by the liquid pressure in the said chamber and is relatively movable under centrifugal force whereby a response to speed is provided, rotatable inertia means, a drive connection between said rotatable inertia means and said rotary member, a resilient means in said drive connection, and a member interposed between said rotary member and said inertia means and being operable in response to relative movement between said rotary member and said inertia means for reacting with the pressure of fluid in said passage and with the resilience of the said resilient means whereby the said response to speed is modified by a response to acceleration.

3. A speed- and acceleration-responsive device of the type translating speed and acceleration changes into changes of pressure of a liquid, comprising a shaft subject to the speed changes, an arm carried by said shaft, a liquid chamber carried by said arm, means for supplying said chamber with a restricted flow of liquid under pressure, outlet means providing a passage for a liquid escape from said chamber, a ball valve comprised in said outlet means and tending to close the said passage under centrifugal force against the action of the liquid pressure in the chamber whereby a response to speed is provided, a flywheel, a drive connection between said flywheel and said shaft, resilient means in said drive connection, and a pivoted beam bearing on the ball valve and engaged by parts connected to the shaft and flywheel respectively, the liquid pressure in the chamber being thereby influenced by relative movement between the shaft and flywheel whereby the said response to speed is modified by a response to acceleration.

4. A speed- and acceleration-responsive device of the type translating speed and acceleration changes into changes of pressure of a liquid, comprising a shaft subject to the speed changes, an arm carried by said shaft, a liquid chamber carried by said arm, means for supplying said chamber with a restricted flow of liquid under pressure, outlet means providing a passage for a liquid escape from said chamber, a ball valve comprised in said outlet means and tending to close the said passage under centrifugal force against the action of the liquid pressure in the chamber whereby a response to speed is provided, a flywheel, a drive connection between said flywheel and said shaft, resilient means in said drive connection, and a valve arm carried by the flywheel and disposed adjacent to an opening in a passage leading from the liquid chamber beyond the ball valve, the liquid pressure in the chamber being thereby influenced by relative movement between the shaft and flywheel whereby the said response to speed is modified by a response to acceleration.

5. A speed- and acceleration-responsive device of the type translating speed and acceleration changes into changes of pressure of a liquid, comprising a rotary member subject to speed changes, a liquid chamber carried by said rotary member, means for supplying to said chamber a restricted flow of liquid under pressure, and outlet means having a single passage for the escape of liquid from said chamber, and said outlet means further comprising a pair of devices for controlling the escape of liquid from said single passage thereby to control pressure in said chamber, one of said devices comprising a valve for said passage rotated by said rotary member eccentrically to the axis thereof to tend to close said passage by centrifugal force, the other of said devices being an inertia device rotatable by said rotatable member and operatively associated with said outlet means and supplementing said valve to control escape of liquid from said chamber through said single passage.

NICOLAS WORTHING.

REFERENCES CITED

The following references are of record in the file of this patent:

UNITED STATES PATENTS

| Number | Name | Date |
|---|---|---|
| 829,908 | Bush | Aug. 28, 1905 |
| 1,440,224 | Kasley | Dec. 26, 1922 |
| 1,509,695 | Volet | Sept. 23, 1924 |
| 1,811,850 | Huff | June 30, 1931 |
| 2,358,894 | Volet | Sept. 26, 1944 |
| 2,368,995 | Mallory | Feb. 6, 1945 |
| 2,376,844 | Ziebolz | May 22, 1945 |
| 2,378,158 | Roche | June 12, 1945 |
| 2,405,382 | Volet | Aug. 6, 1946 |
| 2,472,181 | Werth | June 7, 1949 |
| 2,514,674 | Schorn | July 11, 1950 |

FOREIGN PATENTS

| Number | Country | Date |
|---|---|---|
| 310,564 | Germany | Jan. 31, 1919 |